(12) United States Patent
Kuwata et al.

(10) Patent No.: US 8,965,201 B2
(45) Date of Patent: Feb. 24, 2015

(54) OPTICAL TRANSMISSION DEVICE AND OPTICAL TRANSMISSION METHOD

(75) Inventors: Naoki Kuwata, Kawasaki (JP); Koji Otsubo, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 99 days.

(21) Appl. No.: 13/235,685

(22) Filed: Sep. 19, 2011

(65) Prior Publication Data

US 2012/0121259 A1 May 17, 2012

(30) Foreign Application Priority Data

Nov. 12, 2010 (JP) .................................. 2010-254280

(51) Int. Cl.
*H04B 10/08* (2006.01)
*H04B 10/079* (2013.01)
*H04B 10/67* (2013.01)

(52) U.S. Cl.
CPC ........ *H04B 10/07955* (2013.01); *H04B 10/673* (2013.01)
USPC ................. 398/38; 398/157; 398/92; 398/94; 359/337.1; 359/337.13

(58) Field of Classification Search
CPC combination set(s) only.
See application file for complete search history.

(56) References Cited

U.S. PATENT DOCUMENTS

| 6,560,008 | B1 | 5/2003 | Wada |
| 6,747,791 | B1 * | 6/2004 | Yang et al. ................. 359/337.1 |
| 6,941,079 | B1 * | 9/2005 | Barozzi et al. ............... 398/157 |
| 7,362,498 | B1 * | 4/2008 | Li et al. .................... 359/341.41 |
| 2003/0053750 | A1 * | 3/2003 | Yang et al. ...................... 385/27 |

FOREIGN PATENT DOCUMENTS

| JP | 2001-144692 | 5/2001 |
| JP | 2008-166719 | 7/2008 |

* cited by examiner

*Primary Examiner* — Ken Vanderpuye
*Assistant Examiner* — Merlin Brito Peguero
(74) *Attorney, Agent, or Firm* — Fujitsu Patent Center (57) ABSTRACT

An optical transmission device includes a first power monitor to monitor a first signal into which second signals with respectively different wavelengths are multiplexed so as to measure received power of the first signal; an amplifier to amplify the first signal, to generate a third signal; a driver to drive the amplifier; a demultiplexer to separate the third signal into fourth signals with the different respectively wavelengths; second power monitors each to monitor each of the fourth signals so as to measure received power of each of the fourth signals; a memory to store therein data related to gain in the amplifier, the data corresponding to each of wavelengths of the second signals, with respect to parameters which are the received power measured by the first power monitor and driving condition; and a processor to calculate power of each of the second signals.

8 Claims, 10 Drawing Sheets

SOA GAIN OF WAVELENGTH λ1 (dB)

| TOTAL RECEIVED POWER (dBm) | SOA CURRENT (mA) | | | | | |
|---|---|---|---|---|---|---|
| | 30 | 60 | 90 | 120 | 150 | 180 |
| -30 | -10.8 | -6.5 | -2.2 | 5.3 | 13.1 | 17.4 |
| -24 | -16.7 | -11.7 | -6.1 | 2.9 | 11.4 | 15.8 |
| -18 | -22.5 | -15.4 | -8.0 | 2.0 | 10.7 | 15.1 |
| -12 | -27.8 | -17.2 | -8.6 | 1.6 | 10.1 | 14.1 |
| -6 | -32.0 | -17.9 | -8.9 | 1.1 | 8.7 | 12.0 |
| 0 | -33.3 | -17.6 | -9.0 | -0.1 | 6.0 | 8.6 |
| 6 | -31.2 | -16.4 | -9.1 | -2.3 | 2.1 | 4.3 |
| 12 | -24.7 | -14.0 | -9.7 | -5.4 | -2.2 | -0.4 |

FIG. 5

SOA GAIN OF WAVELENGTH λ2 (dB)

| TOTAL RECEIVED POWER (dBm) | SOA CURRENT (mA) | | | | | |
|---|---|---|---|---|---|---|
| | 30 | 60 | 90 | 120 | 150 | 180 |
| -30 | -9.5 | -6.6 | -0.5 | 7.6 | 13.9 | 17.9 |
| -24 | -15.4 | -9.8 | -3.7 | 5.6 | 12.2 | 16.3 |
| -18 | -20.8 | -12.6 | -5.1 | 4.8 | 11.5 | 15.5 |
| -12 | -24.8 | -13.7 | -5.6 | 4.4 | 10.9 | 14.6 |
| -6 | -27.0 | -14.0 | -5.8 | 3.8 | 9.5 | 12.6 |
| 0 | -27.0 | -13.7 | -6.0 | 2.3 | 6.9 | 9.3 |
| 6 | -24.8 | -13.0 | -6.8 | -0.5 | 3.0 | 5.0 |
| 12 | -20.0 | -12.1 | -8.3 | -4.2 | -1.5 | 0.2 |

FIG. 6

SOA GAIN OF WAVELENGTH λ3 (dB)  
23

| TOTAL RECEIVED POWER (dBm) | SOA CURRENT (mA) | | | | | |
|---|---|---|---|---|---|---|
| | 30 | 60 | 90 | 120 | 150 | 180 |
| -30 | -8.6 | -3.3 | 1.3 | 8.4 | 14.8 | 18.0 |
| -24 | -14.2 | -7.3 | -1.5 | 6.5 | 13.1 | 16.4 |
| -18 | -18.9 | -9.3 | -2.7 | 5.7 | 12.5 | 15.7 |
| -12 | -21.8 | -10.0 | -3.1 | 5.3 | 11.8 | 14.8 |
| -6 | -22.9 | -10.2 | -3.3 | 4.6 | 10.3 | 12.9 |
| 0 | -22.6 | -10.1 | -3.8 | 2.9 | 7.4 | 9.4 |
| 6 | -20.5 | -10.0 | -5.2 | -0.2 | 3.3 | 5.0 |
| 12 | -17.6 | -10.0 | -7.0 | -3.7 | -1.1 | 0.3 |

FIG. 7

SOA GAIN OF WAVELENGTH λ4 (dB)  
24

| TOTAL RECEIVED POWER (dBm) | SOA CURRENT (mA) | | | | | |
|---|---|---|---|---|---|---|
| | 30 | 60 | 90 | 120 | 150 | 180 |
| -30 | -8.2 | -2.3 | 2.3 | 9.4 | 14.7 | 18.1 |
| -24 | -13.3 | -5.4 | -0.1 | 7.8 | 13.3 | 16.7 |
| -18 | -16.8 | -6.9 | -1.0 | 7.1 | 12.7 | 16.0 |
| -12 | -18.4 | -7.3 | -1.3 | 6.7 | 12.0 | 15.0 |
| -6 | -18.8 | -7.4 | -1.5 | 5.8 | 10.4 | 13.0 |
| 0 | -18.5 | -7.5 | -2.3 | 3.9 | 7.5 | 9.5 |
| 6 | -16.9 | -8.0 | -4.1 | 0.5 | 3.4 | 5.1 |
| 12 | -14.6 | -8.7 | -6.4 | -3.3 | -1.1 | 0.4 |

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2010-254280, filed on Nov. 12, 2010, the entire contents of which are incorporated herein by reference.

FIELD

The embodiments discussed herein are related to an optical transmission device and an optical transmission method.

BACKGROUND

One of ordinary optical transmission systems is a wavelength division multiplexing (WDM) system. In the WDM system, an optical transmission device on a transmitter side multiplexes a plurality of optical signals with different respectively wavelengths and provides the multiplexed signal to one optical fiber. An optical transmission device on a receiver side separates the WDM signal received from one optical fiber into optical signals with the individual wavelengths, and a photo detector therein receives each of the separate optical signals with the respective wavelengths. An optical transmission device which relays a WDM signal may be provided between the devices of the transmitter side and the receiver side in some cases.

The device on the receiver side may amplify a WDM signal by means of an amplifier before separating the WDM signal into optical signals with respective wavelengths, and so may be the device for the relay. The optical transmission device described above monitors received optical power of the respective wavelengths included in the WDM signal before amplifying the WDM signal by means of the amplifier. The optical transmission device can have a grasp of working condition of the optical transmission device by calculating input power of optical signals with the respective wavelengths on the basis of a gain depending upon a working current of the amplifier. The amplifier is, e.g., a semiconductor optical amplifier (SOA).

A method for controlling an amplifier is to control a gain of the amplifier on the basis of a level of a dummy signal inputted to the amplifier, a level of the dummy signal amplified and outputted by the amplifier, and calibration data related to a gain characteristic of the amplifier. Another method is to separate a WDM signal amplified by the amplifier into a plurality of groups in accordance with the wavelengths, and to control the gain of the amplifier on the basis of input power calculated for each of the groups without using a dummy signal.

Related arts described above are disclosed in Japanese Laid-open Patent Application Publications No. 2008-166719 and No. 2001-144692.

The use of a dummy signal, however, is in need of a circuit which produces the dummy signal and a WDM optical signal filter which separates the dummy signal from other signals to be inputted to the amplifier, and thus the scale of the circuits is enlarged. Further, in order to separate a WDM signal having been amplified into a plurality of groups and to monitor received power for each of the groups, it is supposed to calculate the input power for each of the groups on the basis of the gain depending upon the working current of the amplifier. In such a case, the amplifier has characteristics of a change of the gain depending upon the input power and a gain variation depending upon the wavelengths, in such a way that the gain depends much upon the input power upon the working point coming close to a gain saturation area. Thus, a deviation of input power between wavelengths cannot be distinguished from a gain difference of the amplifier between the wavelengths, resulting in that the received optical power of the respective wavelengths included in the WDM signal can be monitored less precisely.

SUMMARY

According to an aspect of the embodiment, there is provided an optical transmission device, the optical transmission device including: a first optical power monitor configured to monitor a first optical signal into which a plurality of second optical signals with respectively different wavelengths are multiplexed so as to measure received power of the first optical signal; an amplifier configured to amplify the first optical signal so as to generate a third optical signal; a driver configured to drive the amplifier; a demultiplexer configured to separate the third optical signal into a plurality of fourth optical signals with the respectively different wavelengths; a plurality of second optical power monitors each being configured to monitor each of the plurality of fourth optical signals so as to measure received power of each of the plurality of fourth optical signals; a memory configured to store therein data related to gain in the amplifier, the data corresponding to each of wavelengths of the plurality of second optical signals, with respect to parameters which are the received power measured by the first optical power monitor and condition in which the driver drives the amplifier; and a processor configured to calculate power of each of the plurality of second optical signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferable embodiments of the optical transmission device and the optical transmission method will be explained below in detail with reference to the drawings. The optical transmission device and the optical transmission method are to obtain in advance a gain for every wavelength according to a measurement of received power of a WDM signal and the condition in which the WDM signal is amplified, and to calculate power inputted to the amplifier for every wavelength on the basis of the gain of every wavelength and the measured received power of every wavelength after being amplified, so as to monitor the received optical power of every wavelength before being amplified. For following explanations of respective embodiments, components similar to each other are given a same reference numeral, and repeated explanations will be omitted.

First Embodiment

Figure 1:
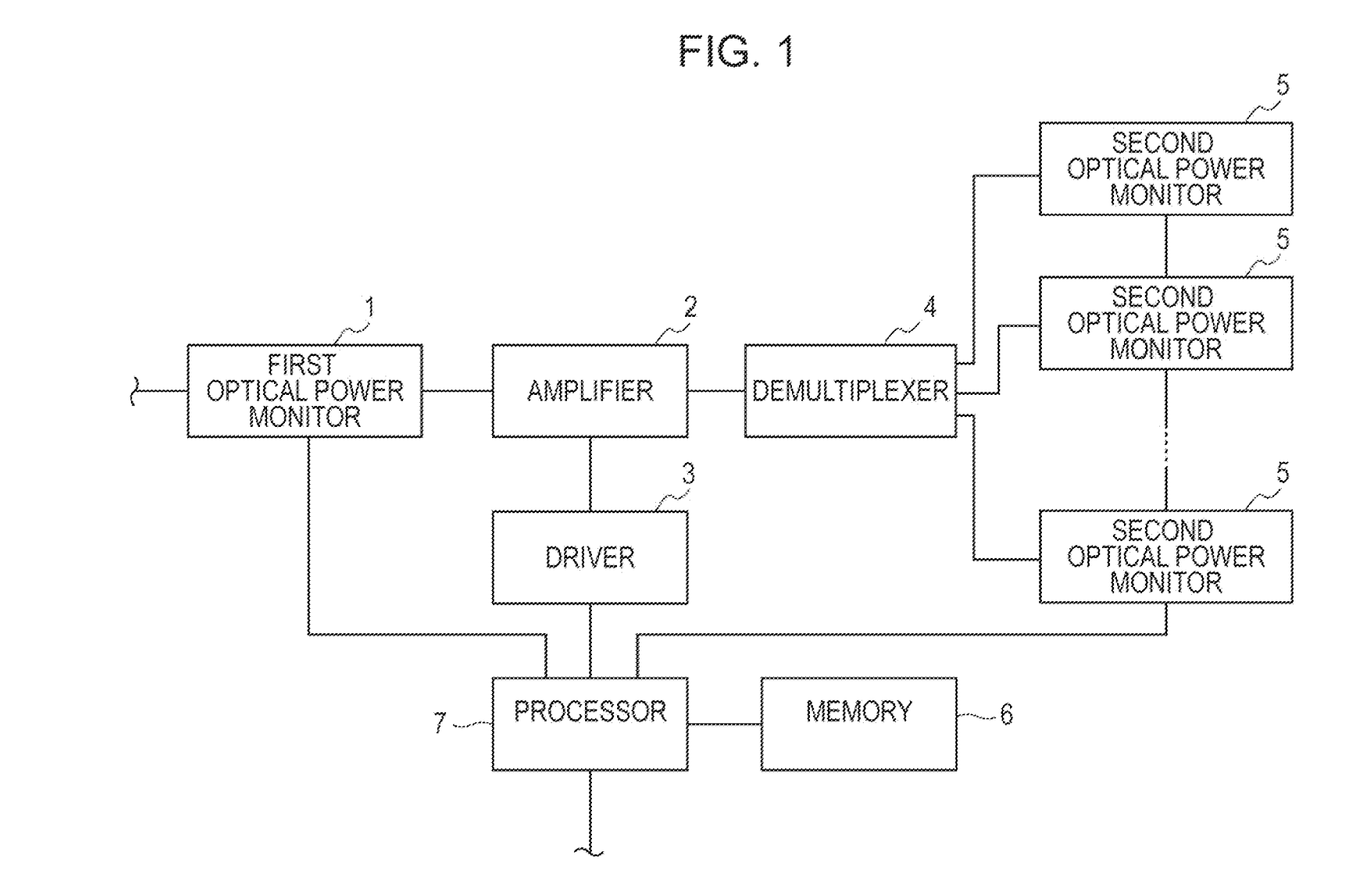
FIG. 1 is a block diagram which illustrates an optical transmission device of a first embodiment.

FIG. 1 is a block diagram which illustrates an optical transmission device of a first embodiment. As illustrated in FIG. 1, the optical transmission device has a first optical power monitor 1, an amplifier 2, a driver 3, a demultiplexer 4 a plurality of second optical power monitors 5, a memory 6 and a processor 7.

The first optical power monitor 1 measures received power of a WDM signal. A plurality of optical signals with different respectively wavelengths is multiplexed in a WDM signal. The amplifier 2 amplifies a WDM signal. The driver 3 drives the amplifier 2. The demultiplexer 4 separates the WDM signal amplified by the amplifier 2 into optical signals with the respective wavelengths. Each of the second optical power monitors 5 measures received optical power of each of the separated optical signals with the respective wavelengths. The memory 6 stores therein data related to gains of the respective wavelengths of the WDM signal amplified in the amplifier 2 with respect to parameters which are the received power of the WDM signal measured by the first optical power monitor 1 and condition in which the driver 3 drives the amplifier 2.

The processor 7 calculates gain values of the respective wavelengths in the amplifier 2 on the basis of received power of a WDM signal practically measured by the first optical power monitor 1, the condition in which the driver 3 practically drives the amplifier 2, and the data related to the gains stored in the memory 6. The processor 7 calculates values of the optical power of the respective wavelengths inputted to the amplifier 2 on the basis of the gain values of the respective wavelengths and values of the optical power of the respective wavelengths practically measured by the respective second optical power monitors 5. The processor 7 provides another device such as a control device which is not illustrated with calculated results.

Figure 2:
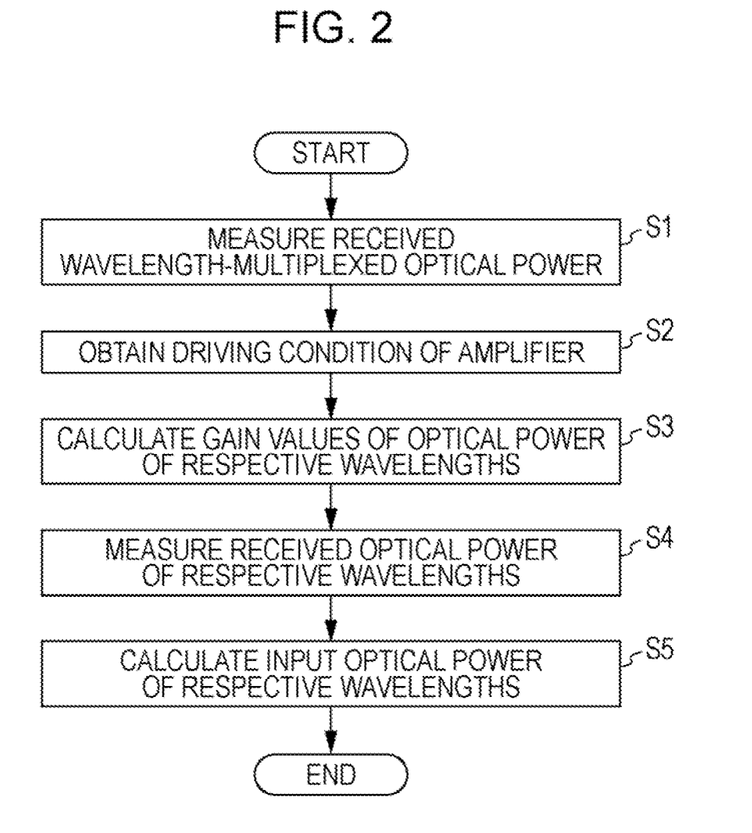
FIG. 2 is a flowchart which illustrates an optical transmission method of the first embodiment.

FIG. 2 is a flowchart which illustrates an optical transmission method of the first embodiment. As illustrated in FIG. 2, at first, the first optical power monitor 1 measures received power of a WDM signal (operation S1). The processor 7 obtains a measurement of the received power of the WDM signal from the first optical power monitor 1. The amplifier 2 amplifies the WDM signal. The processor 7 obtains condition in which the amplifier 2 is driven when the amplifier 2 amplifies the WDM signal, from the driver 3 (operation S2).

The processor 7 calculates gain corresponding to the respective wavelengths in the amplifier 2 on the basis of the measurement of the received power of the WDM signal obtained from the first optical power monitor 1, the obtained value of the driving condition of the amplifier 2 obtained from the driver 3, and the data related to the gains read from the memory 6 (operation S3). Each of the second optical power monitors 5 measures received optical power corresponding to each of the wavelengths separated by the demultiplexer 4 into the respective wavelengths after being amplified by the amplifier 4 (operation S4).

The processor 7 obtains a measurement of the received optical power corresponding to each of the wavelengths from each of the second optical power monitors 5. The processor 7 calculates the optical power of the respective wavelengths inputted to the amplifier 2 on the basis of the gain values of the respective wavelengths and the measurements of the received power of the respective wavelengths (operation S5). Then, a series of the processes ends. Incidentally, the order of the operations S1 and S2 is interchangeable as long as they finish before the operation S3. Further, the operation S4 may be before the operation S3 as long as the operation S4 finishes before the operation S5.

According to the first embodiment, the optical power of the respective wavelengths included in the WDM signal and inputted to the amplifier 2 is calculated on the basis of the received optical power practically inputted to the amplifier 2 and the known gain data of the respective wavelengths of the amplifier 2. As the gains of the amplifier 2 depend upon the received power of the WDM signal inputted to the amplifier 2 rather than upon received power differences among the respective wavelengths included in the WDM signal inputted to the amplifier 2, the received optical power of the respective wavelengths before being amplified can be precisely calculated. The received optical power of the respective wavelengths included in the WDM signal can thereby be precisely observed.

Further, as the received power of the WDM signal inputted to the amplifier 2 is measured so that the received optical power of the respective wavelengths before being amplified is calculated, the first optical power monitor 1 does not need a separating device (demultiplexer) for separating the WDM signal inputted to the amplifier 2 into a plurality of optical signals with the respective wavelengths such as a WDM DMUX (WDM Demultiplexer). It is enough for the first optical power monitor 1 to have, e.g., one photo detector which receives a WDM signal. The optical transmission device can thereby prevent the scale of the circuits from being enlarged.

Second Embodiment

Figure 3:
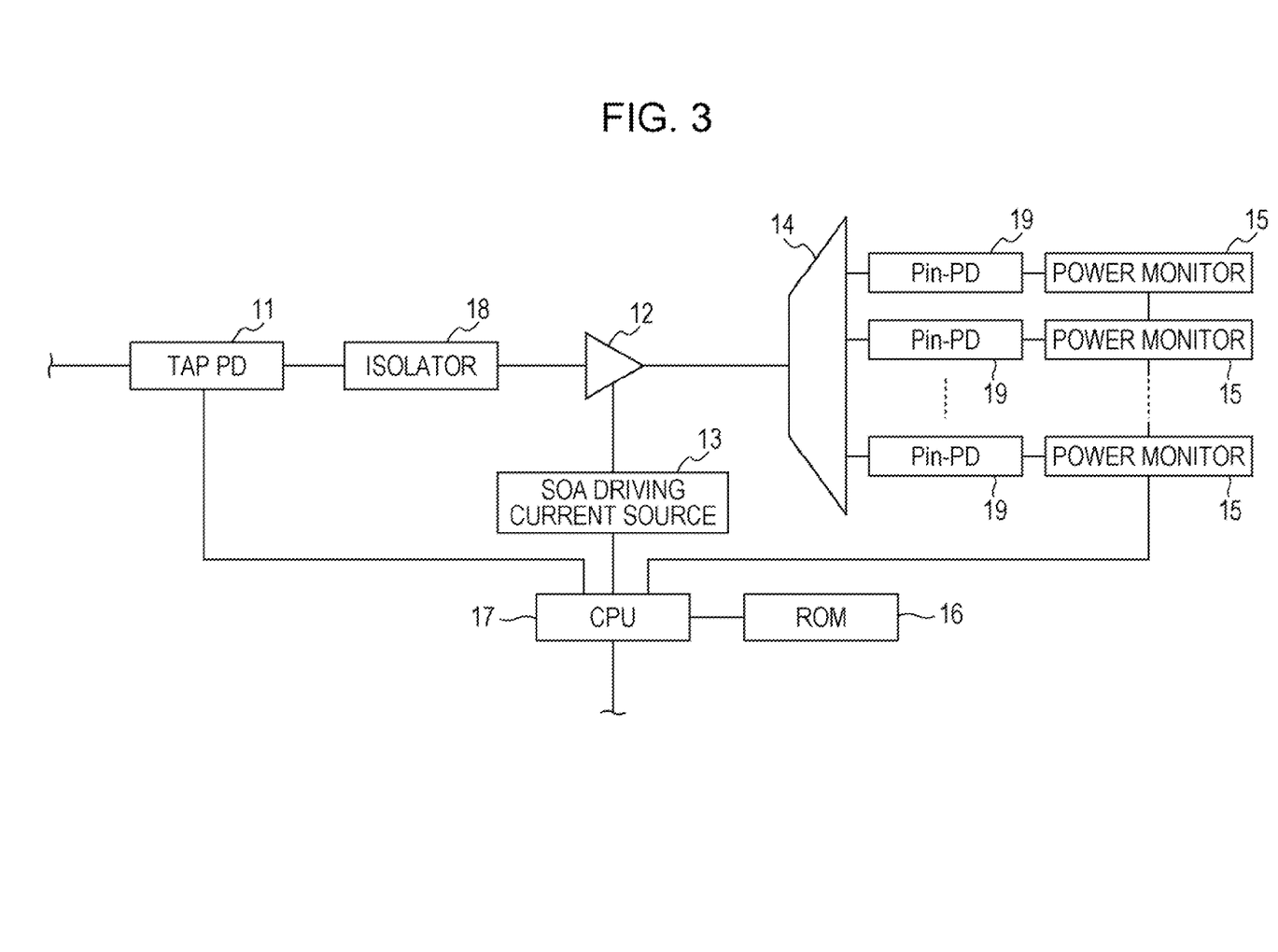
FIG. 3 is a block diagram which illustrates an optical transmission device of a second embodiment.
Figure 4:
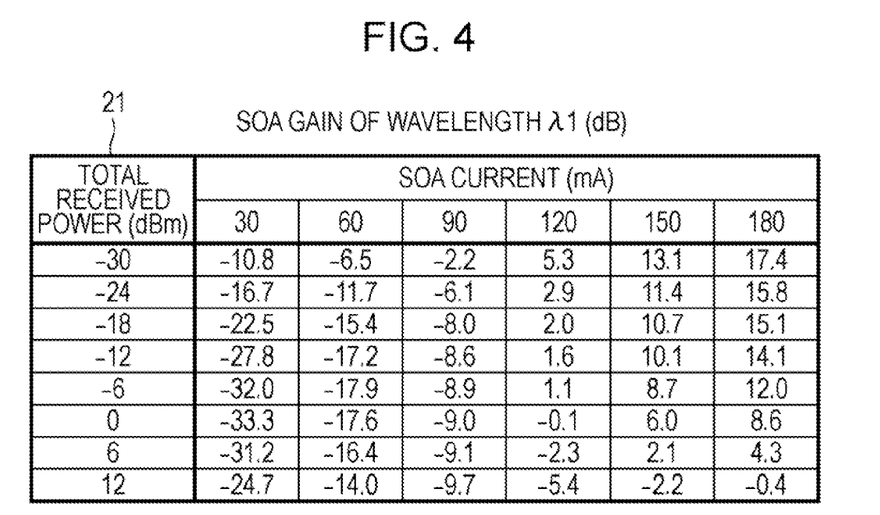
FIG. 4 illustrates a table of exemplary gain values corresponding to a wavelength λ1.
Figure 5:
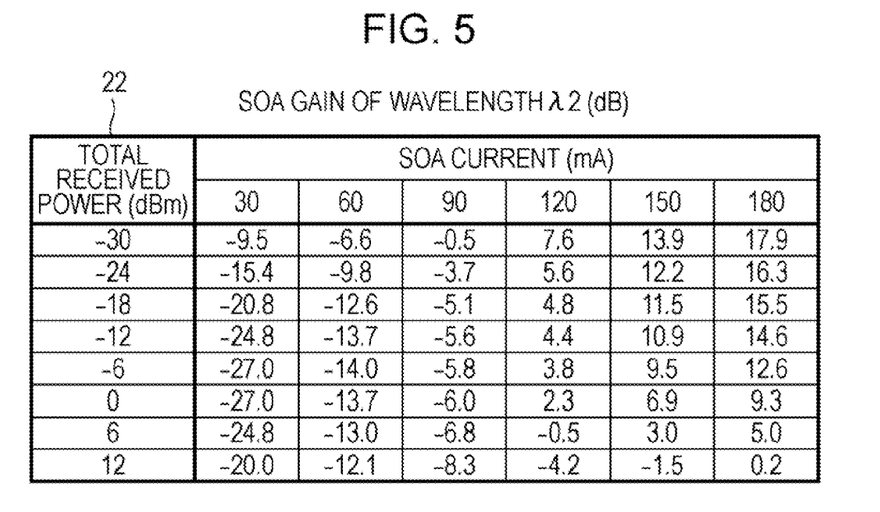
FIG. 5 illustrates a table of exemplary gain values corresponding to a wavelength λ2.
Figure 6:
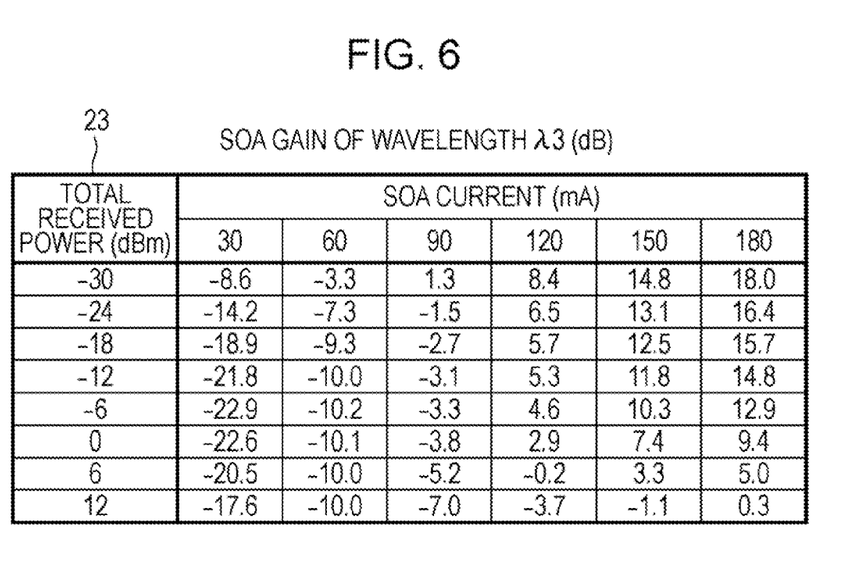
FIG. 6 illustrates a table of exemplary gain values corresponding to a wavelength λ3.
Figure 7:
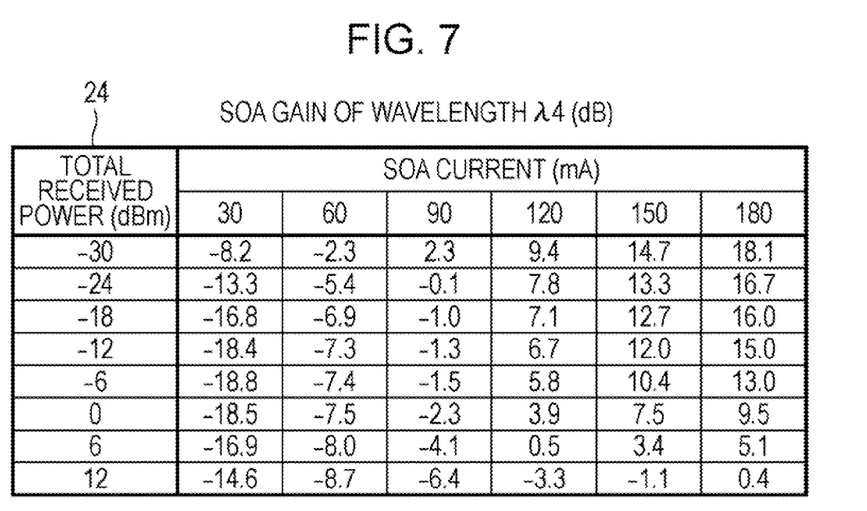
FIG. 7 illustrates a table of exemplary gain values corresponding to a wavelength λ4.

FIG. 3 is a block diagram which illustrates an optical transmission device of a second embodiment. As illustrated in FIG. 3, the optical transmission device has, e.g., a tap PD (Photodiode) 11 as the first optical power monitor, e.g., a semiconductor optical amplifier (SOA) 12 as the amplifier, e.g., an SOA driving current source 13 as the driver, e.g., a WDM DMUX 14 as the demultiplexer, e.g., a plurality of combinations of Pin-PDs (P-intrinsic-N Photodiodes) 19 and power monitors 15 as the plural second optical power monitors, e.g., a ROM (Read Only Memory) 16 as the memory, and, e.g., a CPU (Central Processing Unit) 17 as the processor. Incidentally, another optical amplifier such as an optical fiber amplifier may be used as the amplifier.

The tap PD 11 is optically coupled to an input end of the optical transmission device. The tap PD 11 separates a WDM signal inputted to the optical transmission device into a WDM signal to be transmitted to the semiconductor optical amplifier 12 and a WDM signal to be monitored. Assume that optical signals with n different wavelengths, λ1-λn, are multiplexed in the WDM signal, where n is an integer being two or more. The tap PD 11 converts the WDM signal to be monitored into an electric signal, so that the received power of the WDM signal is measured. The tap PD 11 outputs a value of the received power of the WDM signal, Pin_all, to the CPU 17.

An isolator 18 is optically coupled between the output end of the tap PD 11 and the input end of the semiconductor optical amplifier 12. The isolator 18 prevents that amplified spontaneous emission (ASE) from the semiconductor optical amplifier 12 is inputted to the tap PD 11. The ASE inputted to the tap PD 11 could cause an error in the measurement of the received power of the WDM signal in the tap PD 11. Thus, as the isolator 18 is inserted, the error caused in the measurement of the received power of the WDM signal is reduced.

The semiconductor optical amplifier 12 is driven by a driving current provided by the SOA driving current source 13. The SOA driving current source 13 provides the CPU 17 with a value of the driving current of the semiconductor optical amplifier 12, Isoa, as the condition in which the semiconductor optical amplifier 12 is driven. The semiconductor optical amplifier 12 amplifies the WDM signal having passed through the tap PD 11 and the isolator 18.

The WDM DMUX 14 is optically coupled to the output end of the semiconductor optical amplifier 12. The WDM DMUX 14 separates the WDM signal amplified by the semiconductor optical amplifier 12 into optical signals with the n different wavelengths, λ1-λn. The WDM DMUX 14 may have, e.g., a dielectric multilayer mirror and a filter which selectively passes each of the wavelengths. Each of at least n output ends of the WDM DMUX 14 is optically coupled to the Pin-PD 19 for the relevant wavelength.

The Pin-PDs 19 are each optically coupled to the power monitor 15. The Pin-PDs 19 each receive the optical signal with one of the wavelengths separated by the WDM DMUX 14 from each other, and convert the optical signal into an electric signal. The power monitors 15 each monitors an output current of the Pin-PD 19, so that the received power of the optical signal of each of the wavelengths after being amplified is measured. The power monitors 15 each provides the CPU 17 with a value of the received power of the optical signal of each of the wavelengths after being amplified, Ppd_i, where i is an integer between and including one and n which represents the number of the wavelength.

Data of gain values corresponding to the respective wavelengths in the semiconductor optical amplifier 12 is stored in the ROM 16 with respect to combinations of the values of the received power measured by the tap PD 11 and the values of the driving current of the semiconductor optical amplifier 12 provided by the SOA driving current source 13. The gains corresponding to the respective wavelengths in the semiconductor optical amplifier 12 are measured with respect to parameters which are the values of the received power of the WDM signal and the values of the driving current of the semiconductor optical amplifier 12 before the optical transmission device starts to work, so that the data of the gains stored in the ROM 16 is obtained. The gain values stored in the ROM 16 are exemplarily illustrated in FIGS. 4-7.

FIGS. 4-7 illustrate tables of exemplary gain values corresponding to the wavelengths λ1-λ4, respectively. FIGS. 4-7 illustrate SOA gain tables 21-24 of the wavelengths λ1-λ4, respectively. The total received power in each of the tables is a value of the received power of the WDM signal measured by the tap PD 11. The total received power is given values of, although not limited to in particular, every 6dBm in the range of −30 to 12 dBm, e.g. The SOA current is a value of the driving current of the semiconductor optical amplifier 12 driven by the SOA driving current source 13. The SOA current is given values of, although not limited to in particular, every 30 mA in the range of 30 to 180 mA, e.g.

The gain (SOA gain) values of the semiconductor optical amplifier 12 are set to the respective combinations of the values of the total received power and the SOA current. Such tables are provided for all the wavelengths included in the WDM signal. Incidentally, the range or interval of the value of the total received power can be selected at will, and so can the range or interval of the value of the SOA current.

The CPU 17 obtains, from the tap PD 11, the value Pin_all of the received power of the WDM signal practically measured by the tap PD 11. The CPU 17, obtains from the SOA driving current source 13, the value Isoa of the driving current that the SOA driving current source 13 practically provides so as to drive the semiconductor optical amplifier 12. The CPU 17 refers to a row in the SOA gain table of each of the wavelengths corresponding to the value Pin_all obtained from the tap PD 11. The CPU 17 refers to a column in the SOA gain table of each of the wavelengths corresponding to the value Isoa obtained from the SOA driving current source 13. Then, the CPU 17 obtains gain values Gi of the respective wavelengths corresponding to the respective combinations of Pin_all and Isoa from the SOA gain tables.

If the SOA gain table does not include what agrees with a combination of Pin_all obtained from the tap PD 11 and Isoa obtained from the SOA driving current source 13, calculate the gain value Gi by means of an interpolation method by using, e.g. four gain values closest to the combination. At this time, any interpolation method can be applied. A conversion equation for interpolation may be stored in the ROM 16 in addition to the SOA gain tables illustrated in FIGS. 4-7.

The CPU 17 divides each of the values of the received power Ppd_i corresponding to the respective wavelengths after being amplified, which is monitored by the respective combinations of the Pin-PDs 19 and the power monitors 19, by each of the gain values Gi corresponding to the respective wavelengths obtained with reference to the SOA gain tables of the respective wavelengths, so as to calculate each of the values of the power of the respective wavelengths inputted to the semiconductor optical amplifier 12, i.e., the values Pin_i of the received optical power of the respective wavelengths before being amplified. A following equation is used for the calculation.

$$Pin\_i = Ppd\_i / Gi$$

Figure 8:
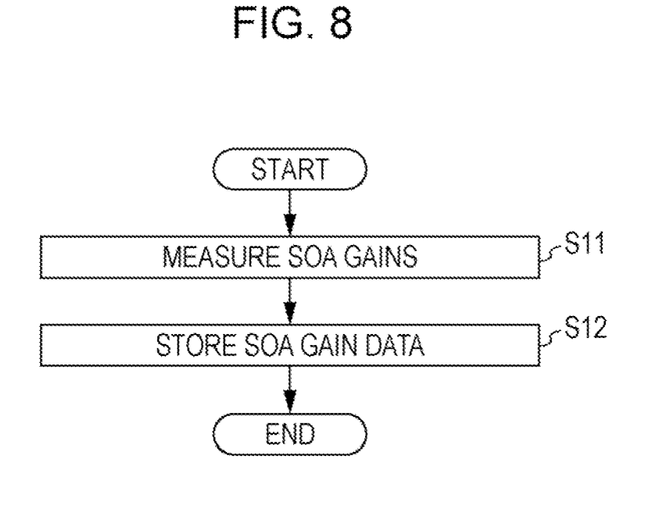
FIG. 8 is a flowchart which illustrates an optical transmission method of the second embodiment.
Figure 9:
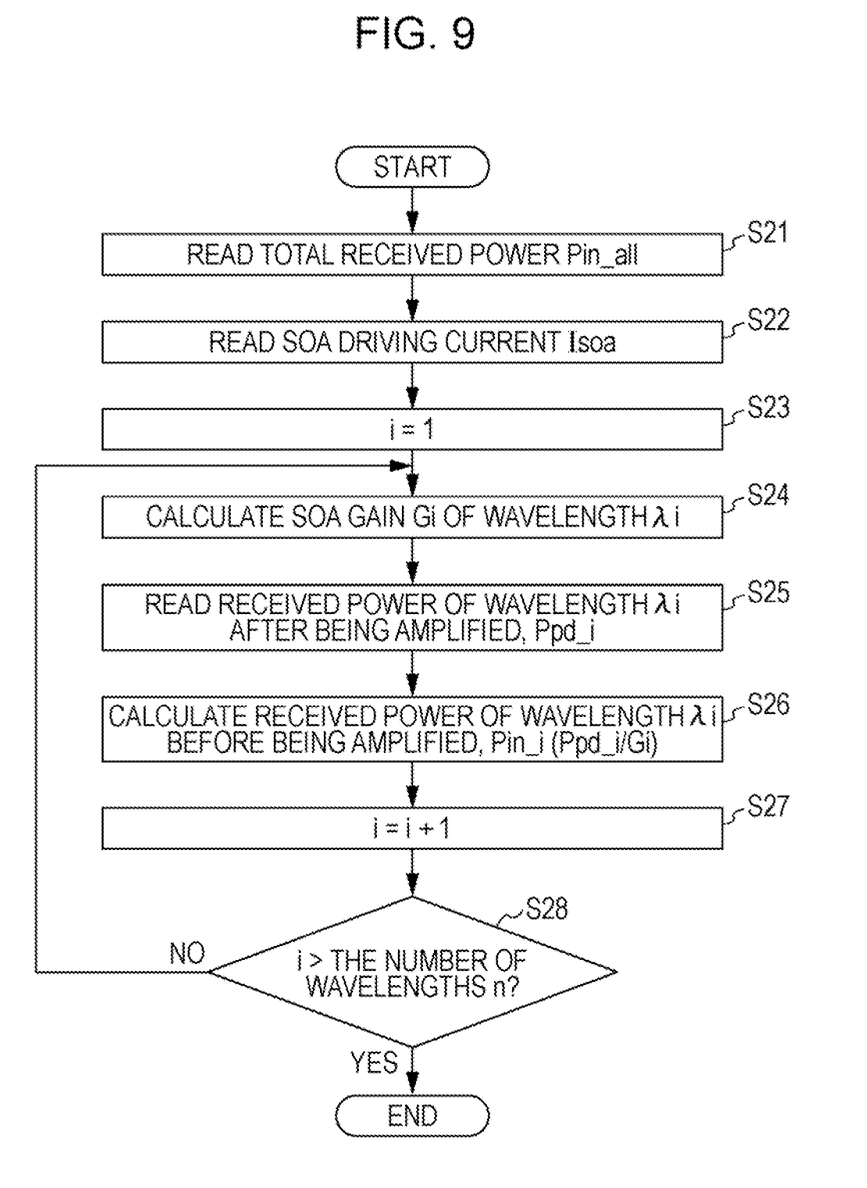
FIG. 9 is a flowchart which illustrates an optical transmission method of the second embodiment.

FIGS. 8 and 9 are flowcharts which illustrate an optical transmission method of the second embodiment. FIG. 8 is a flowchart which illustrates a process for storing data of the gains of the semiconductor optical amplifier 12 in the ROM 16 before the optical transmission device starts to work. As illustrated in FIG. 8, a worker uses, e.g., the optical transmission device illustrated in FIG. 3 at first, so as to measure the gains (SOA gains) of the semiconductor optical amplifier 12 with respect to parameters which are the received power of the WDM signal (total received power) and the driving current (SOA current) of the semiconductor optical amplifier 12 for the respective wavelengths included in the WDM signal (operation S11). Then, the worker stores the data of the gains of the semiconductor optical amplifier 12 (SOA gains) obtained by the measurement in the ROM 16 (operation S12), and the flow ends.

FIG. 9 is a flowchart which illustrates a process for calculating the value Pin_i of the received power of each of the wavelengths before being amplified. As illustrated in FIG. 9, at first, the CPU 17 reads the present value Pin_all of the received power (total received power) of the WDM signal from the tap PD 11 (operation S21). Then, the CPU 17 reads the present value Isoa of the driving current of the semiconductor optical amplifier 12 from the SOA driving current source 13 (operation S22).

Then, the CPU 17 substitutes one for the number i of the wavelength (operation S23). The CPU 17 refers to the SOA gain table of the wavelength $\lambda 1$ stored in the ROM 16. The CPU 17 calculates a gain value G1 of the wavelength $\lambda 1$ corresponding to a combination of Pin_all obtained at the operation S21 and Isoa obtained at the operation S22 by using, e.g., an interpolation method (operation S24). Then, the CPU 17 reads a present value Ppd_1 of the received power of the wavelength $\lambda 1$ after being amplified from one of the combinations of the Pin-PDs 19 and the power monitors 15 into which the optical signal of the wavelength $\lambda 1$ enters (operation S25).

Then, the CPU 17 divides Ppd_1 obtained at the operation S25 by G1 obtained at the operation S24 (Ppd_1/G1), so as to calculate the value Pin_1 of the received optical power corresponding to the wavelength $\lambda 1$ before being amplified (operation S26). Then, the CPU 17 incrementally updates i (operation S27), and identifies whether i is greater than the number n of the wavelengths (operation S28). As i=2 is smaller than the number of the wavelengths n at this time (operation S28: No), and the flow returns to the operation S24.

Then, the CPU 17 repeats the operations S24-S28 until i becomes larger than the number of the wavelengths n at the operation S28. That is, the CPU 17 calculates the gain value Gi of the wavelength $\lambda i$ (operation S24). The CPU 17 reads the present value Ppd_i of the received optical power of the wavelength $\lambda i$ after being amplified (operation S25). The CPU 17 calculates the value Pin_i of the received power corresponding to the wavelength $\lambda i$ before being amplified (operation S26) and incrementally updates i (operation S27). Then, if i is larger than the number n of the wavelengths at the operation S28 (operation S28: Yes), the flow ends. The second embodiment has a same effect that the first embodiment has.

Third Embodiment

Figure 10:
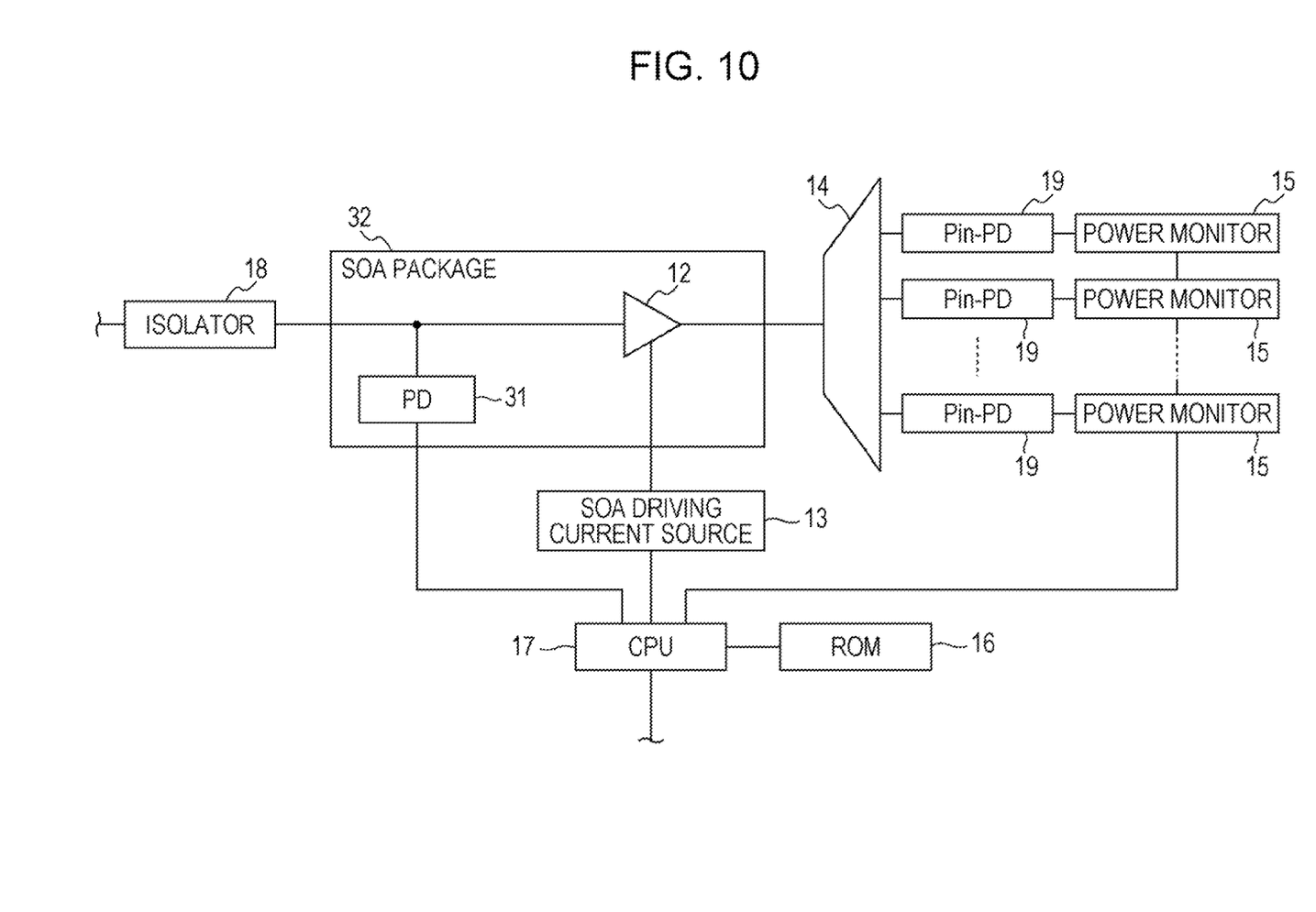
FIG. 10 is a block diagram which illustrates an optical transmission device of a third embodiment.

FIG. 10 is a block diagram which illustrates an optical transmission device of a third embodiment. As illustrated in FIG. 10, the optical transmission device of the third embodiment has, e.g., a PD (Photodiode) 31 instead of the tap PD 11 of the second embodiment as the first optical power monitor 1. The PD 31 can receive, e.g., light with all the wavelengths included in the WDM signal. The PD 31 may be, e.g., integrated in an SOA package 32 in association with the semiconductor optical amplifier 12.

The PD 31 opto-electrically converts the WDM signal to be monitored having branched off between the isolator 18 and the semiconductor optical amplifier 12, so that the received power of the WDM signal before being amplified is measured. The PD 31 outputs the value Pin_all of the received power of the WDM signal to the CPU 17. Other elements of the optical transmission device and the optical transmission method of the third embodiment are same as those of the second embodiment. The third embodiment has a same effect that the first embodiment has.

Fourth Embodiment

Figure 11:
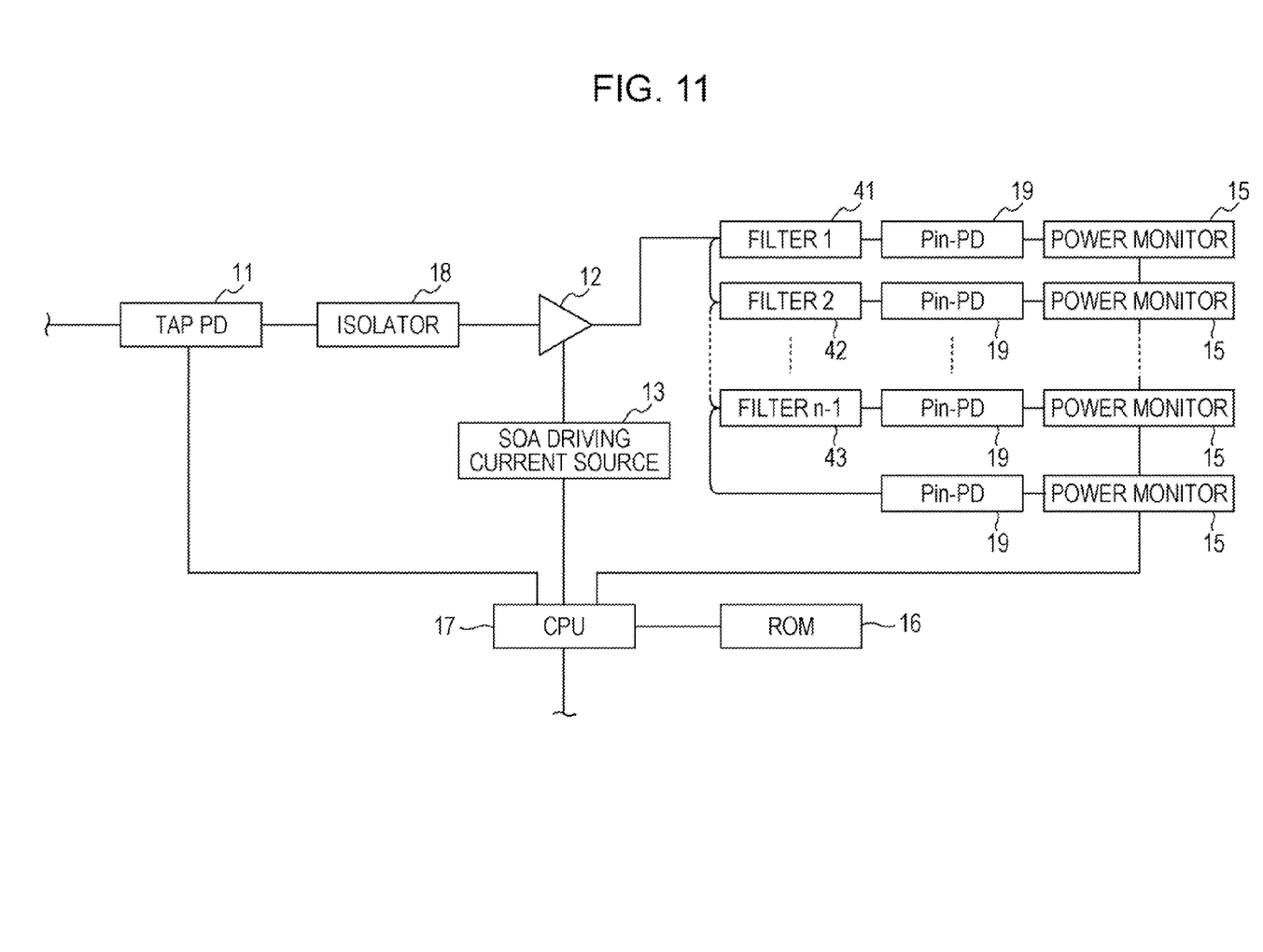
FIG. 11 is a block diagram which illustrates an optical transmission device of a fourth embodiment.

FIG. 11 is a block diagram which illustrates an optical transmission device of a fourth embodiment. As illustrated in FIG. 11, the optical transmission device of the fourth embodiment has, e.g., plural filters 41-43 instead of the WDM DMUX 14 of the second embodiment as the demultiplexer. The filter i passes an optical signal with the wavelength $\lambda 1$. Filters 1_41, 2_42 and n-1_43, e.g., pass optical signals with wavelengths $\lambda 1$, $\lambda 2$ and $\lambda n-1$, respectively.

The filter 1_41 is put before the Pin-PD 19 into which the optical signal with the wavelength $\lambda 1$ enters. The filter 1_41 passes the optical signal with the wavelength $\lambda 1$ included in the WDM signal and lets the passed signal enter into the Pin-PD 19 for the wavelength $\lambda 1$. The filter 2_42 is provided with the optical signals of the wavelengths excluding the wavelength $\lambda 1$ from the WDM signal. The filter 2_42 is put before the Pin-PD 19 into which the optical signal of the wavelength $\lambda 2$ enters. The filter 2_42 passes the optical signal of the wavelength $\lambda 2$ included in the WDM signal provided from the filter 1_41, and lets the passed signal enter into the Pin-PD 19 for the wavelength $\lambda 2$.

The optical signals of the wavelengths excluding the wavelength $\lambda 2$ from the WDM signal provided by the filter 1_41 is provided to a filter omitted to illustrate which transmits an optical signal of the wavelength $\lambda 3$. The wavelengths included in the WDM signal are separated one by one by the filters in this way. A WDM signal in which optical signals of the wavelengths $\lambda n-1$ and $\lambda n$ are multiplexed enters into a filter n-1_43 put before the Pin-PD 19 that an optical signal of the wavelength $\lambda n-1$ enters into. The optical signal of the wavelength $\lambda n-1$ having passed through the filter n-1_43 enters into the Pin-PD 19 for the wavelength $\lambda n-1$. An optical signal of the wavelength $\lambda n$ enters into the Pin-PD 19 for the wavelength $\lambda n$. The fourth embodiment has a same effect that the first embodiment has.

Fifth Embodiment

Figure 12:
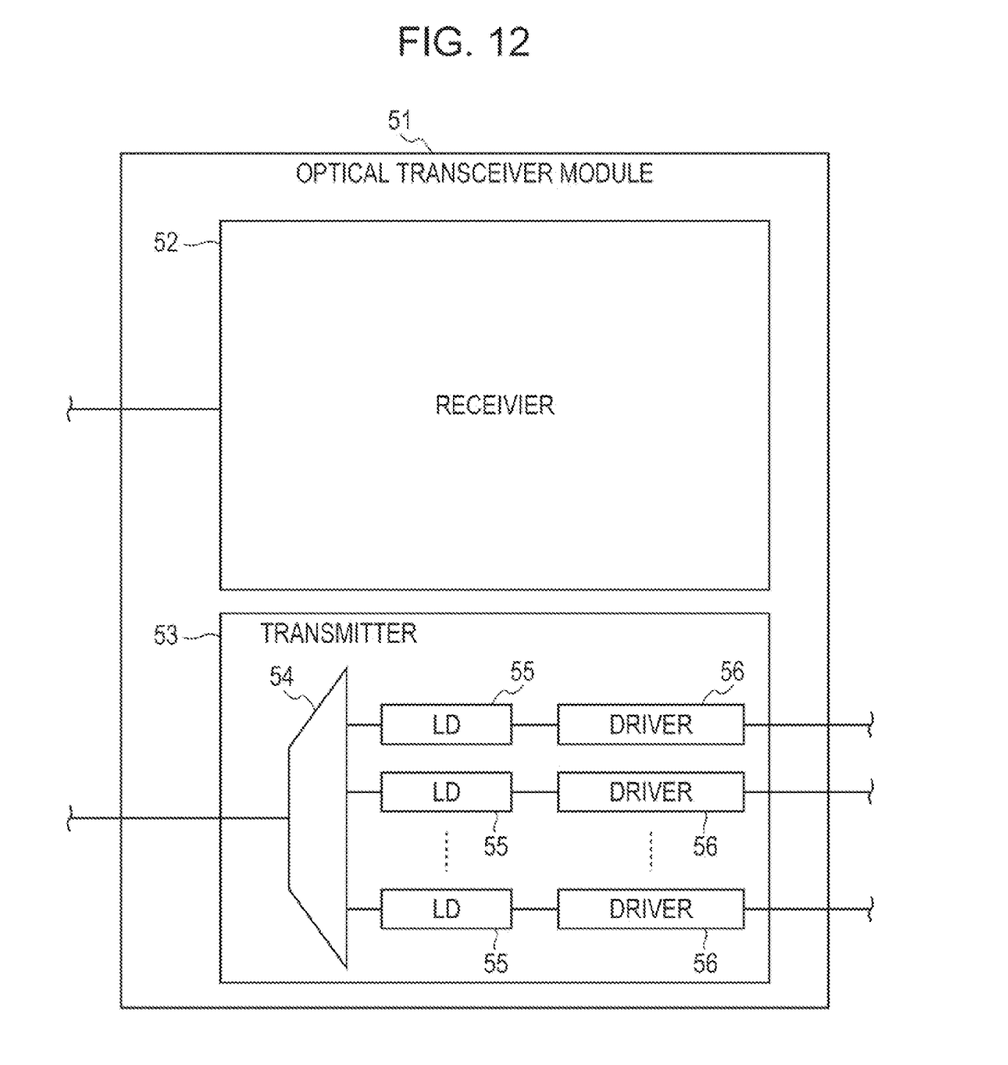
FIG. 12 is a block diagram which illustrates an optical transceiver module of a fifth embodiment.

FIG. 12 is a block diagram which illustrates an optical transceiver module of a fifth embodiment. As illustrated in FIG. 12, an optical transceiver module 51 has a receiver 52 and a transmitter 53. The receiver 52 may include, e.g., the portions of the optical transmission devices of the first to fourth embodiments. The transmitter 53 has, e.g., a WDM MUX (WDM multiplexer) 54, a plurality of LDs (laser diodes) 55 and a plurality of drivers 56. The drivers 56 each drive each of the LDs 55. The LDs 55 each emit an optical signal with a wavelength distinct from each other. The WDM MUX 54 multiplexes the optical signals emitted from the respective LDs 55, and transmits the multiplexed signal to a device on a receiving side which is not illustrated. Incidentally, the optical transceiver module 51 may be configured to multiplex the optical signals with the wavelengths by connecting a filter which passes the optical signal with a transmitted wavelength to each of the LDs excluding the LD which emits the optical signal with the wavelength $\lambda n$ in the same way as the fourth embodiment instead of using the WDM MUX 54.

The optical transmission devices of the first to fourth embodiments and the optical transceiver module of the fifth embodiment may be applied, e.g., to an optical transmission device and an optical transceiver module which are used for 100-Gigabit Ethernet for next generation. Incidentally, they may be applied to other systems excluding 100-Gigabit Ethernet for next generation.

According to the optical transmission device and the optical transmission method, the received optical power of the respective wavelengths included in the WDM signal can be precisely observed, and the scale of the circuits can be prevented from being enlarged.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission device comprising:
a first optical power monitor configured to monitor a first optical signal, the first optical signal being a multiplexed signal received by the optical transmission device into which a plurality of second optical signals with respectively different wavelengths are multiplexed, the first optical power monitor obtains a received power of the first optical signal;
an amplifier configured to amplify the first optical signal so as to generate a third optical signal;
a driver configured to drive the amplifier;
a demultiplexer configured to separate the third optical signal into a plurality of fourth optical signals with the respectively different wavelengths;
a plurality of second optical power monitors each being configured to monitor each of the plurality of fourth optical signals so as to measure received power of each of the plurality of fourth optical signals;
a memory configured to store therein data related to gain in the amplifier measured in advance, corresponding to each of wavelengths of the plurality of second optical signals, with respect to a combination of the received power measured by the first optical power monitor and the condition in which the driver drives the amplifier, the received power being the power of the first optical signal prior to amplification by the amplifier of the optical transmission device; and
a processor configured to calculate gain of each of the plurality of second optical signals with respect to the combination of the received power measured by the first optical power monitor and condition in which the driver drives the amplifier, by interpolating data related to a gain close to the combination, stored in the memory, and to calculate power of each of the plurality of the second optical signals, based on the calculated gain in the amplifier and the measured received power of each of the plurality of fourth optical signals.

2. The optical transmission device according to claim 1, wherein, in the memory, an equation for interpolating the data related to the gain in the amplifier measured in advance, corresponding to each of wavelengths of the plurality of second optical signals, is stored with respect to the combination of the received power measured by the first optical power monitor and the condition in which the driver drives the amplifier, and
wherein the processor calculates the gain of each of the plurality of second optical signals with respect to the combination of the received power measured by the first optical power monitor and the condition in which the driver drives the amplifier, by calculating the equation.

3. The optical transmission device according to claim 1, wherein the condition in which the driver drives the amplifier is a condition related to a driving current with which the amplifier is provided.

4. The optical transmission device according to claim 1, wherein the processor calculates the power of each of the plurality of second optical signals by dividing an amount of the received power of each of the plurality of fourth optical signals measured by each of the plurality of second optical power monitors by an amount of gain of each of the plurality of second optical signals, calculated by the processor.

5. An optical transmission method comprising:
measuring received power of a first optical signal into which a plurality of second optical signals with respectively different wavelengths are multiplexed;
obtaining data of driving condition of an amplifier that amplifies the first optical signal so as to generate a third optical signal;
calculating gain of each of the plurality of second optical signals in the amplifier, based on the measured received power of the first optical signal, the obtained data of driving condition of the amplifier, and data related to a gain that includes data related to gain of each of the plurality of second optical signals in the amplifier measured in advance with respect to a combination of the measured received power of the first optical signal and the driving condition, the received power being the power of the first optical signal prior to amplification by an optical transmission device performing the optical transmission method;
measuring received power of a plurality of fourth optical signals with the respectively different wavelengths, into which the third optical signal is separated;
calculating, with a processor, the gain of each of the plurality of the second optical signals with respect to the combination of the measured received power and the obtained driving condition, by interpolating data related to the gain close to the combination included in the data related to the gain; and
calculating power of each of the plurality of second optical signals, based on the calculated gain of each of the plurality of second optical signals and the measured received power of each of the plurality of fourth optical signals.

6. The optical transmission method according to claim 5, wherein the driving condition is a condition related to a driving current with which the amplifier is provided.

7. The optical transmission method according to claim 5, wherein the power of each of the plurality of second optical signals is calculated by dividing an amount of the measured received power of each of the plurality of fourth optical signals by an amount of the gain of each of the plurality of second optical signals.

8. The optical transmission method according to claim 5, further comprising:
driving the amplifier based on the calculated power of each of the plurality of second optical signals and the received power, the amplifier being driven without use of a dummy signal.

* * * * *